(12) United States Patent
Spurling et al.

(10) Patent No.: US 12,054,196 B2
(45) Date of Patent: Aug. 6, 2024

(54) SYSTEMS FOR A FASTENING DEVICE OF AN EXHAUST-GAS AFTERTREATMENT SYSTEM

(71) Applicant: Ford Global Technologies, LLC, Dearborn, MI (US)

(72) Inventors: Michael Spurling, Romford (GB); Marius Sawatzki, Pulheim (DE); Daniel Meckenstock, Wuppertal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 441 days.

(21) Appl. No.: 17/112,619

(22) Filed: Dec. 4, 2020

(65) Prior Publication Data

US 2021/0171105 A1   Jun. 10, 2021

(30) Foreign Application Priority Data

Dec. 5, 2019   (DE) .......................... 102019133112.9

(51) Int. Cl.
*B62D 21/11* (2006.01)
*B62D 21/15* (2006.01)
*F01N 13/18* (2010.01)

(52) U.S. Cl.
CPC ............ *B62D 21/11* (2013.01); *B62D 21/155* (2013.01); *F01N 13/1822* (2013.01)

(58) Field of Classification Search
CPC .... B62D 21/11; B62D 21/155; F01N 13/1822
See application file for complete search history.

(56) References Cited

U.S. PATENT DOCUMENTS

| | | | | | |
|---|---|---|---|---|---|
| 3,261,579 | A | * | 7/1966 | Engman | F16L 25/04 180/311 |
| 4,029,305 | A | * | 6/1977 | Schubert | B60G 17/052 267/152 |
| 5,267,630 | A | * | 12/1993 | Watanabe | F16F 7/00 180/312 |
| 5,958,603 | A | * | 9/1999 | Ragland | F16L 59/08 72/379.6 |
| 6,209,844 | B1 | * | 4/2001 | Brucker | B60K 13/04 248/70 |
| 6,276,044 | B1 | * | 8/2001 | Ragland | F01N 1/24 29/521 |
| 6,412,587 | B1 | | 7/2002 | Weimert et al. | |
| 8,151,922 | B2 | * | 4/2012 | Suzuki | B60K 13/04 180/89.2 |
| 11,247,740 | B2 | * | 2/2022 | Nagata | B60K 13/04 |

(Continued)

FOREIGN PATENT DOCUMENTS

| | | |
|---|---|---|
| DE | 102008011441 A1 | 9/2008 |
| DE | 102008054267 A1 | 5/2010 |

(Continued)

*Primary Examiner* — Jason D Shanske
*Assistant Examiner* — Joselynn Y Sliteris
(74) *Attorney, Agent, or Firm* — Vincent Mastrogiacomo; McCoy Russell LLP

(57) ABSTRACT

Systems are provided for a fastening system. In one example, the fastening system comprises a fastening element coupled to each of a subframe and an aftertreatment device. The fastening element is configured to alter a path of travel of the aftertreatment device in response to a deformation of the subframe.

12 Claims, 5 Drawing Sheets

(56) References Cited

U.S. PATENT DOCUMENTS

2006/0266891 A1  11/2006  Stammel et al.
2018/0318908 A1* 11/2018  Stergioulas ........... B21F 33/005

FOREIGN PATENT DOCUMENTS

| JP | 2005133546 A | 5/2005 |
| JP | 2009241793 A | 10/2009 |
| JP | 5329382 B2 | 10/2013 |
| JP | 5381937 B2 | 1/2014 |

* cited by examiner ns against which the housing abuts in the assembled state and which are spaced apart from one another in the circumferential direction of the housing. Furthermore, the at least two abutment bodies are arranged so as to be spaced apart from one another transversely with respect to the adjustment direction. Tolerance-induced deviations in position of the exhaust-gas treatment device can be compensated by the displaceability of the abutment bodies and by the flexibility of the clamp.

SYSTEMS FOR A FASTENING DEVICE OF AN EXHAUST-GAS AFTERTREATMENT SYSTEM

CROSS-REFERENCE TO RELATED APPLICATIONS

The present application claims priority to German Patent Application No. 102019133112.9 filed on Dec. 5, 2019. The entire contents of the above-listed application is hereby incorporated by reference for all purposes.

FIELD

The present description relates generally to a fastening device of an exhaust-gas aftertreatment system

BACKGROUND/SUMMARY

In the field of motor vehicles with internal combustion engines (combustion machines), it is known for components to route exhaust-gas recirculation to an inlet side of the internal combustion engines, and/or components for purification of the exhaust gas, to be used in an exhaust-gas section of the internal combustion engines.

Owing to more stringent existing and future exhaust-gas regulations, there is a high demand for installation space for components for exhaust-gas aftertreatment, such as for example exhaust-gas catalytic converter, nitrogen oxide trap (Lean NOx Trap), diesel particle filter or gasoline particle filter and urea injector. For reasons relating to technical process implementation, it is often necessary for the components for exhaust-gas aftertreatment to be arranged in the immediate vicinity of the internal combustion engine. In motor vehicles which are common nowadays, with an engine compartment arranged at the front, this demand for installation space competes with the demand for deformation zones for minimizing bulkhead degradation in the case of a contact event. An additional demand for installation space exists in the case of mechanical all-wheel-drive (AWD) power transmission units, which occupy or limit the installation space at the lower rear side of the drivetrain and thus make it necessary for the components for exhaust-gas aftertreatment to be led around these restrictions.

As a further condition that has to be satisfied for the installation of the components for exhaust-gas aftertreatment, the thermal expansion of such components during operation must be taken into consideration.

For example, DE 10 2008 054 267 B4 describes a bracket for the fastening of an exhaust-gas treatment device, such as for example a catalytic converter or a particle filter, to a vehicle component, such as for example an engine block or a body. The bracket comprises a base plate for the fastening of the bracket to the respective vehicle component and at least two abutment bodies, against which a housing of the exhaust-gas treatment device for fastening laterally abuts in the assembled state, which abutment bodies are fixed to the base plate in a holding direction running perpendicular to the plate plane, and which abutment bodies are arranged on the base plate so as to be bidirectionally adjustable in an adjustment direction running transversely with respect to the holding direction. Furthermore, the bracket comprises at least one clamp which, in the assembled state, engages around the housing and presses said housing against the respective abutment body, wherein the at least one clamp fixes the housing to the base plate in the assembled state. Here, the respective abutment body has two abutment sec- It is furthermore known to use a thermal insulator in order to improve the technical process implementation through the attainment of an expedient temperature profile at the components for exhaust-gas aftertreatment.

For this purpose, DE 10 2008 011 441 B4 proposes a fastening device for the fastening of an exhaust-gas purification element to an engine of a motor vehicle having an exhaust tailpipe system which is connected to said engine and which has an exhaust-gas purification element of said type. The fastening device comprises a carrier, which is provided for being fastened to the engine, and at least one fastening element, which is fastened to the carrier and which serves for the fastening of the exhaust-gas purification element. The fastening device has at least one means for thermal insulation of at least one section of the exhaust-gas purification element, wherein the means for thermal insulation is formed by a casing formed from two half-shells. Here, the two half-shells are fixedly connected to the fastening element by at least one connecting means. Furthermore, the means for thermal insulation comprise at least one opening for the leadthrough of a means for secure clamping. The fastening element comprises, on the one hand, at least two clamps which each have at least one free end, and, on the other hand, at least one means for the attachment of the free ends of two of said clamps with regard to the fastening of the element for exhaust-gas purification. Each of the two half-shells is fixedly connected to one of the clamps of the fastening element, specifically by at least one connecting means.

On the one hand, the components for arrangement in the engine compartment must be arranged as close to one another as possible in order to attain a compact construction. On the other hand, this increases the risk of oscillations or vibrations being transmitted between the components. This must generally be avoided as far as possible in the context of satisfying existing NVH (noise, vibration, harshness) demands and in particular for vibration-sensitive components such as an exhaust-gas catalytic converter.

JP 2005 133 546 A proposes a solution for an exhaust-gas structure of an internal combustion engine with turbocharger. In order, in an exhaust-gas channel of the internal combustion engine, to reduce a spacing between an exhaust-gas catalytic converter on the downstream side of the turbocharger and a bulkhead, the internal combustion engine and the transmission are installed vertically in an engine compartment in front of the bulkhead, and the turbocharger is attached, via the exhaust-gas manifold, on one side of the internal combustion engine in a lateral direction. Here, the front end of the exhaust-gas channel, which is arranged between the exhaust-gas catalytic converter and the turbocharger, is connected via a seal ring to an outlet opening of the turbocharger, which outlet opening is directed toward the bulkhead. By absorption of engine vibrations by means of the sealing ring, a spacing of the turbocharger to the exhaust-gas catalytic converter on the downstream side can be reduced.

US 2006/0266891 A1 has described a motor vehicle with an internal combustion engine, with a transmission, with an exhaust-gas system with catalytic converter, and with an exhaust-gas system holding arrangement for the fastening of the exhaust-gas system. Here, the exhaust-gas system is fastened by means of the exhaust-gas holding arrangement to the engine and/or to the transmission, wherein the exhaust-gas holding arrangement a support element in the form of a plate holder with at least two band-like, elastic plates which are situated one above the other and which thus form a stack and which, at least over a part of their length, can move relative to one another. Vibrations of the exhaust-gas system can be dampened as a result of the friction between the plate surfaces.

U.S. Pat. No. 6,412,587 B1 has disclosed a vehicle exhaust-gas system with a suspension arrangement. The exhaust-gas system is designed for a power unit formed from a transmission and a combustion machine, which power unit is installed into a motor vehicle with a body. The exhaust-gas system, which has a silencer formed as an elongate tubular body, is connected to the combustion machine and is arranged by means of elastic elements. The exhaust-gas system is attached by means of outlet devices to cylinder heads of the internal combustion engine and is connected to a silencer via exhaust-gas lines which are of defined shape and which are equipped with exhaust-gas catalytic converters. To attain a defined advantageous vibration characteristic of the exhaust-gas system, a suspension means is provided on the silencer, which suspension means comprises the elastic elements, bears against various wall regions of the silencer, and is held on the transmission and/or the combustion machine of the power unit via fastening devices and independently of the vehicle body.

The competing demands for installation space within the engine compartment demonstrate a constant conflict with the given dimensions of the front end of the motor vehicle and the platform capabilities thereof with regard to free deformation zones. The space for free deformation zones is reduced with every non-deformable component that is added in the vehicle front end. This increases the likelihood of undesired movement in a rearward direction in the case of a frontal contact event, with the consequence of a considerable increase in a deceleration of vehicle occupants and an increase of the vehicle pulse index (VPI).

To resolve this, there are various known examples in the field.

As an example, JP 2009 241 793 A describes a front part structure of a body of a motor vehicle, with which, even in the case of a relatively large exhaust-gas catalytic converter container, degradation of a bulkhead in the case of a frontal contact event of the motor vehicle can be prevented. The front part structure comprises a subframe, which is provided below a front side frame of the front part structure and to which lower arms of a front wheel suspension apparatus are attached. An engine is held on the subframe and the front side frames. An outlet opening of the engine is provided at the vehicle body front side. The subframes are equipped with right-hand and left-hand longitudinal members which extend in a longitudinal direction of the vehicle body to the left and to the right in front of the engine. A catalytic converter container with a horizontal element for the connection of a vertical element in the direction of the vehicle width is connected to the engine via an exhaust-gas pipe and is formed in an elongate shape in which exhaust-gas pipes are connected to both ends in the longitudinal direction. The catalytic converter container is arranged so as to extend, in the direction of the vehicle width, in the space between the cross member and the engine.

Since the outlet opening of the engine is provided on the surface of the engine at the front side of the vehicle body, the catalytic converter container can be arranged in front of the engine, while at the same time the outlet pipe can be shortened. Thus, because the catalytic converter container is arranged in front of the engine, a contact of the catalytic converter container with the bulkhead can be blocked, even if the engine is pushed rearward in the case of a frontal contact event.

Furthermore, JP 5329382 B2 has disclosed a vehicle body front structure, with which, in the event of a frontal contact, an ingress of a catalytic converter, which is arranged at the rear side of an engine, into another vehicle space can be mitigated. An engine compartment is provided in a front section of a vehicle body. An engine is arranged in the engine compartment, and a catalytic converter for the purification of the exhaust gas is held on the rear side of the engine via a support. Into the vehicle body front structure, which is equipped with a bulkhead that separates the engine compartment and the vehicle space, the catalytic converter faces toward the front side of the bulkhead. A lower dashboard crossmember, which has a higher strength in the direction from front to rear than the support, is provided in the direction of the vehicle width.

Furthermore, JP 5381937 B2 describes an exhaust-gas apparatus of a vehicle, which exhaust-gas apparatus is designed such that the discharged exhaust gas is recirculated to the intake side via an exhaust-gas recirculation system (EGR system), wherein, in the direction of the vehicle width, an exhaust-gas purification unit is situated closer than the turbocharger to the outer side. The exhaust-gas recirculation system comprises an EGR cooler, which is arranged between a rear side wall surface of the engine and the exhaust-gas purification unit, an EGR control valve unit, which is arranged at a downstream side of the EGR cooler and which serves for the control of the exhaust-gas recirculation flow rate, a first EGR line for the feed of exhaust gas to the EGR cooler, and a second EGR line for the feed of exhaust gas discharged from the EGR cooler to the EGR control valve unit. A third EGR line is provided in order to discharge the exhaust gas discharged from the control valve unit to the inlet side of the engine. The turbocharger and the exhaust-gas purification unit are arranged adjacent to one another, in the direction of a vehicle width, on that side of the engine which faces toward the vehicle rear side.

The second EGR pipe is installed so as to extend between the turbocharger and the exhaust-gas purification unit to the vehicle rear side. The EGR control valve unit is arranged at a downstream side of the exhaust-gas purification unit, as viewed in the direction from front to rear of the vehicle, in the region of the tunnel section of the bulkhead. Thus, the turbocharger, the exhaust-gas purification unit, the EGR cooling device, the EGR control valve unit etc. can be arranged around the engine in a compact manner without interfering with one another. Furthermore, if an impact load acts in the direction of the rear end at the time of a contact of the vehicle, an impairment of the bulkhead by the EGR control valve unit can be prevented in an effective manner.

In view of the prior art highlighted, the field of fastening devices for components for the exhaust-gas aftertreatment of an internal combustion engine, which is arranged in particular in an engine compartment of a vehicle front end, still has potential for improvement.

One trivial solution for obtaining a space for deformation zones within the engine compartment despite an increase of a number of non-deformable components for exhaust-gas aftertreatment is an increase in length of the vehicle front end, which would however considerably increase the weight of the motor vehicle, which is not acceptable.

In one example, the issues described above may be addressed by a system for a fastening system comprising a tether physically coupled to each of an aftertreatment device of an exhaust aftertreatment system at a first extreme end and a vehicle subframe at a second extreme end. In this way, the aftertreatment device may only travel a threshold distance in a first direction before the tether applies a force thereto and alters its direction of travel.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
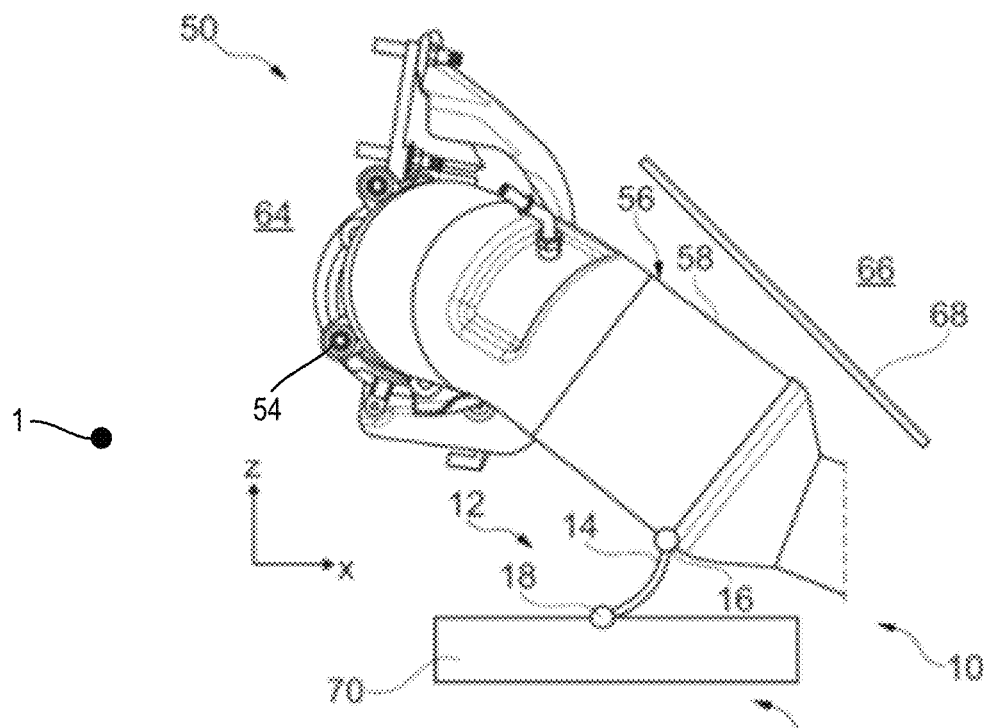
FIG. 1 shows parts of an exhaust-gas section of an internal combustion engine having a component for exhaust-gas aftertreatment and having a fastening device according to the disclosure in an installation state in a schematic side view.
Figure 2:
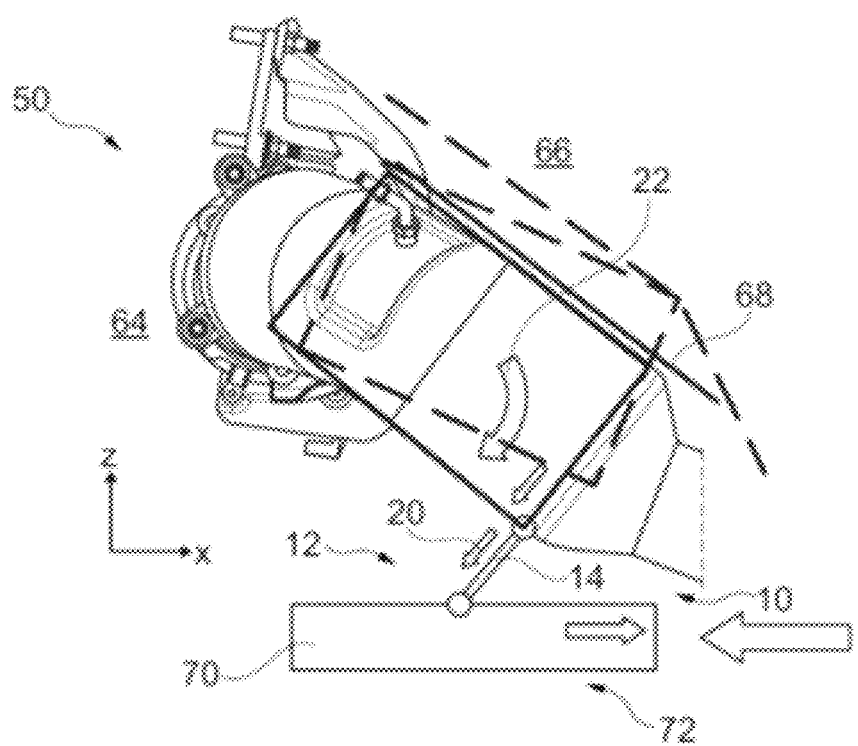
FIG. 2 shows the exhaust-gas section as per FIG. 1 in the same view after the onset of a frontal contact event.
Figure 3:
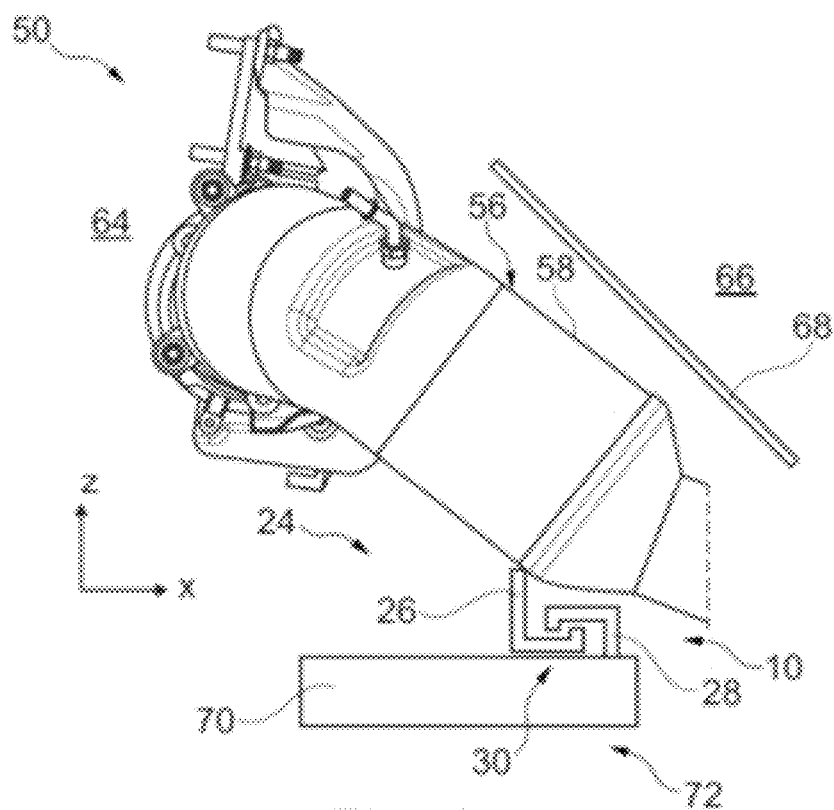
FIG. 3 shows the exhaust-gas section as per FIG. 1 in the same view with an alternative embodiment of the fastening element of the fastening device according to the disclosure.
Figure 4:
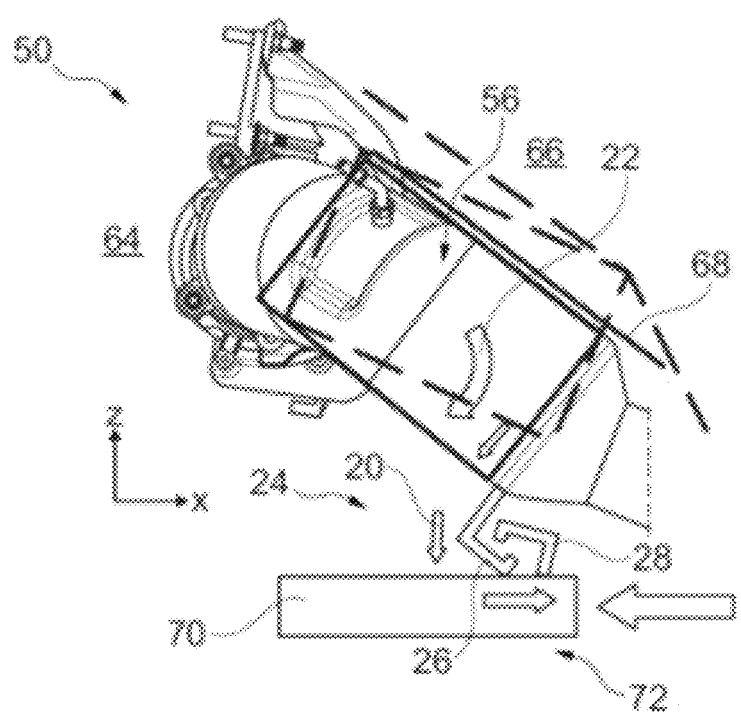
FIG. 4 shows the exhaust-gas section as per FIG. 3 in the same view after the onset of a frontal contact event.
Figure 5:
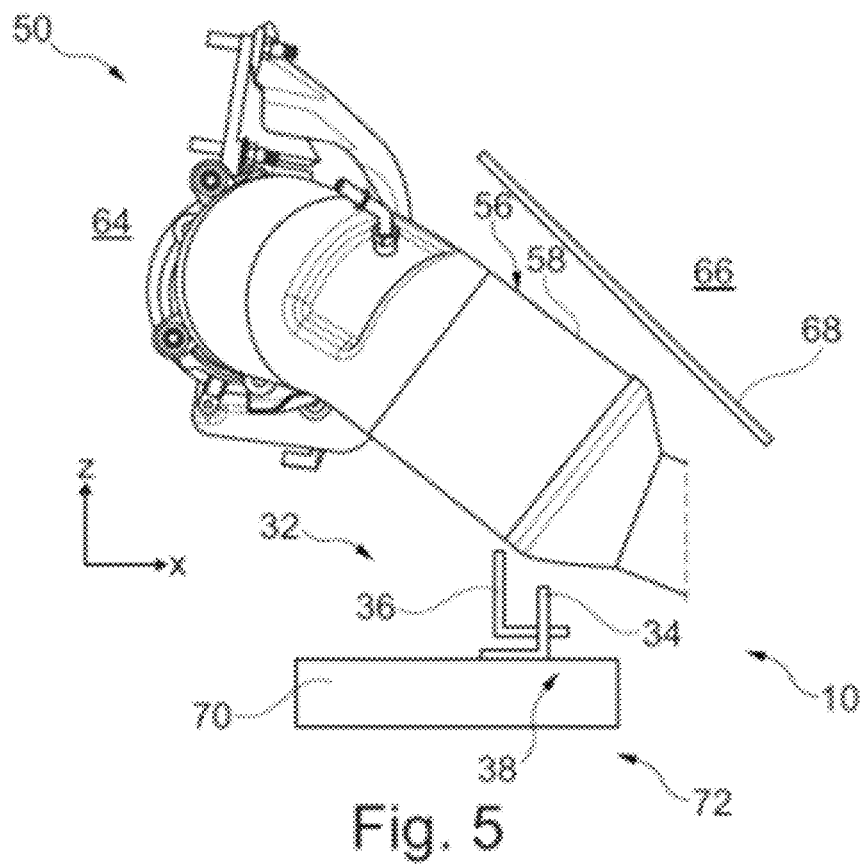
FIG. 5 shows the exhaust-gas section as per FIG. 1 in the same view with a further alternative embodiment of the fastening element of the fastening device according to the disclosure.
Figure 6:
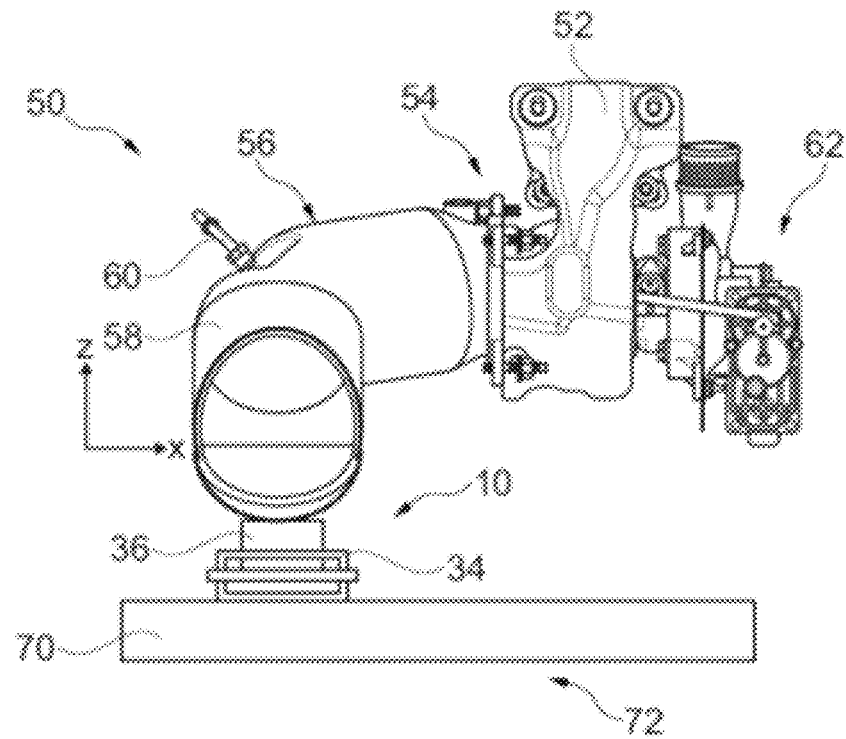
FIG. 6 shows the exhaust-gas section as per FIG. 5 in a schematic front view.
Figure 7:
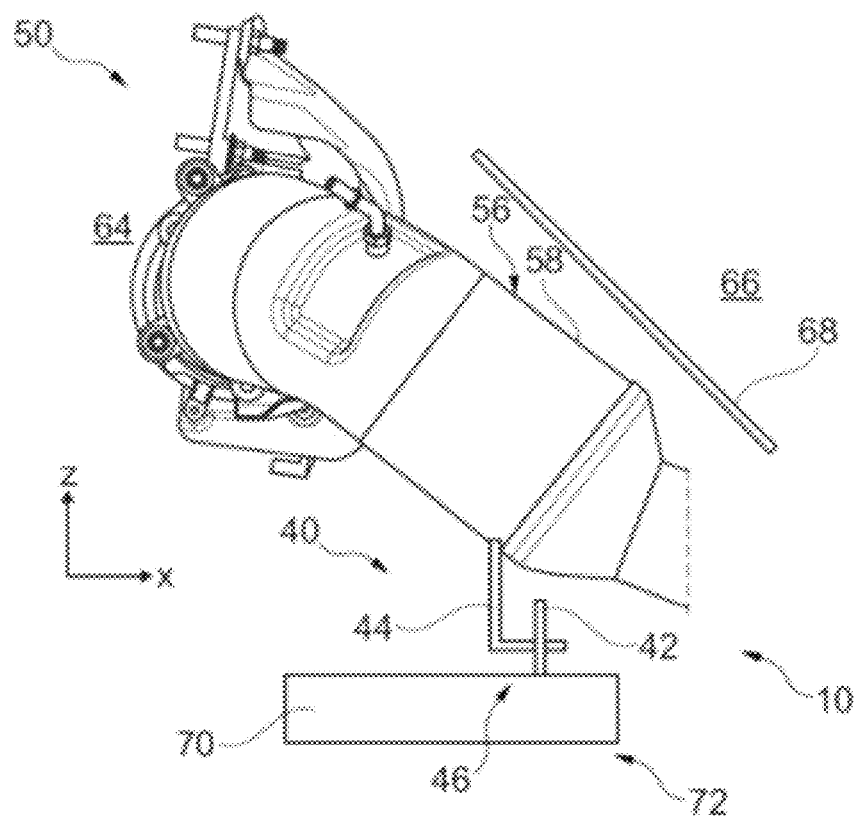
FIG. 7 shows the exhaust-gas section as per FIG. 1 in the same view with a further alternative embodiment of the fastening element of the fastening device according to the disclosure.
Figure 8:
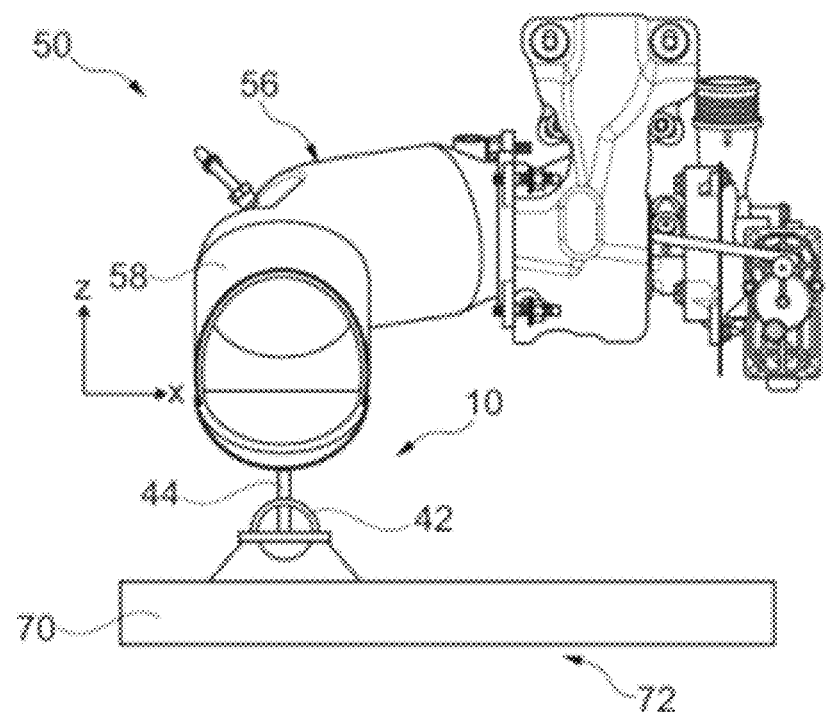
FIG. 8 shows the exhaust-gas section as per FIG. 7 in a schematic front view.
Figure 9:
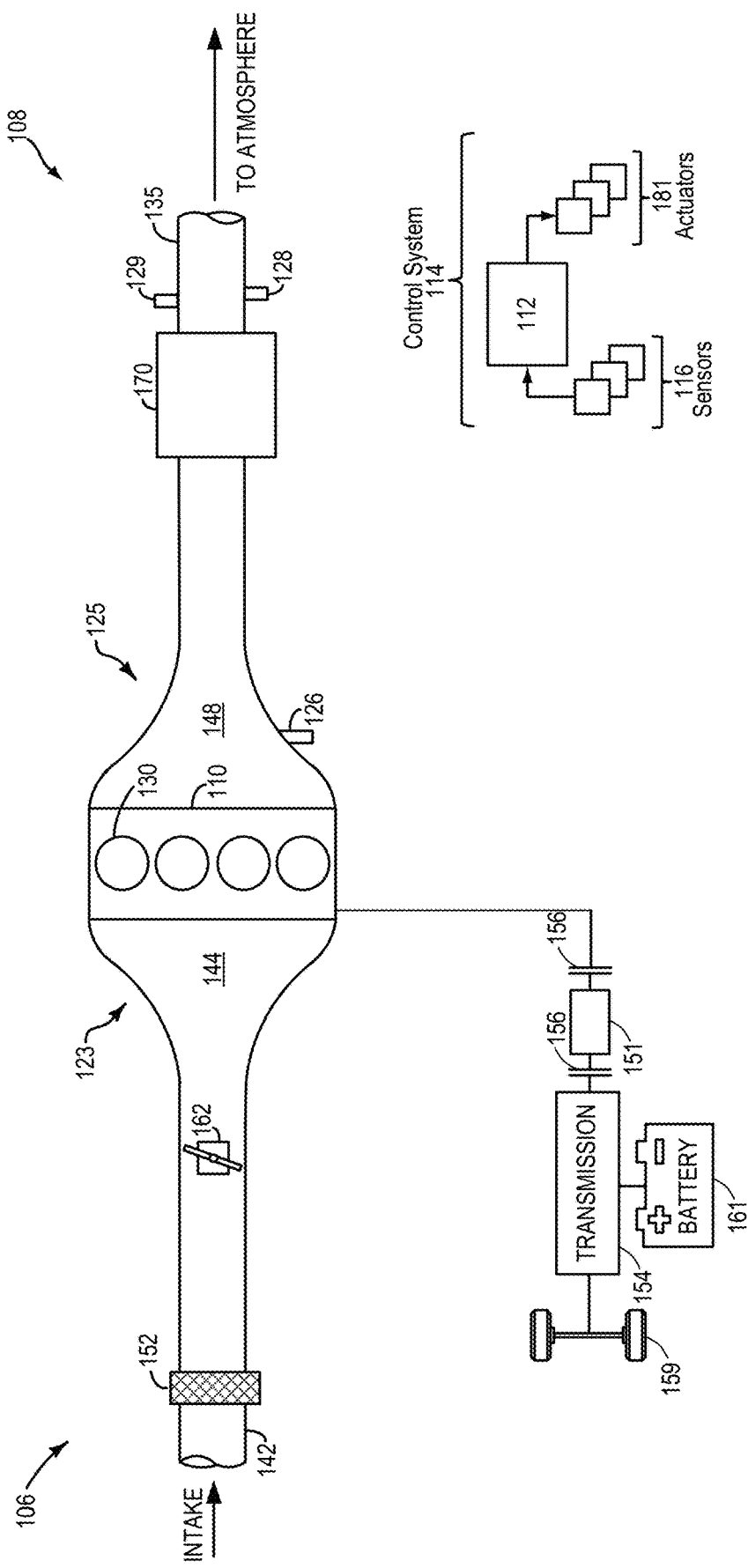
FIG. 9 shows an example vehicle in which the fastening device is arranged.

The following description relates to systems a fastening device. FIG. 1 shows parts of an exhaust-gas section of an internal combustion engine having a component for exhaust-gas aftertreatment and having a fastening device according to the disclosure in an installation state in a schematic side view. FIG. 2 shows the exhaust-gas section as per FIG. 1 in the same view after the onset of a frontal contact event. FIG. 3 shows the exhaust-gas section as per FIG. 1 in the same view with an alternative embodiment of the fastening element of the fastening device according to the disclosure. FIG. 4 shows the exhaust-gas section as per FIG. 3 in the same view after the onset of a frontal contact event. FIG. 5 shows the exhaust-gas section as per FIG. 1 in the same view with a further alternative embodiment of the fastening element of the fastening device according to the disclosure. FIG. 6 shows the exhaust-gas section as per FIG. 5 in a schematic front view. FIG. 7 shows the exhaust-gas section as per FIG. 1 in the same view with a further alternative embodiment of the fastening element of the fastening device according to the disclosure. FIG. 8 shows the exhaust-gas section as per FIG. 7 in a schematic front view. FIG. 9 shows an example vehicle in which the fastening device is arranged.

The disclosure is related to providing a fastening device for at least one component for exhaust-gas aftertreatment of an internal combustion engine which is arranged in an engine compartment of a vehicle front end, which fastening device has a non-complex design and is effective in blocking a movement of the component beyond a threshold amount in one or more directions in the case of a frontal contact event.

It is pointed out that the features and measures specified individually in the following description may be combined with one another in any technically expedient manner and highlight further configurations of the disclosure. The description additionally characterizes and specifies the disclosure in particular in conjunction with the figures.

The fastening device according to the disclosure for the fastening of at least one component for exhaust-gas aftertreatment of an internal combustion engine of a motor vehicle drivetrain has at least one fastening element which is fixedly attached to the at least one component. Here, the at least one fastening element is additionally fixedly attachable to a chassis of the motor vehicle. In an installation state of the component, the at least one fastening element does not form a force introduction path parallel to a direction of straight-ahead travel between the at least one component and the chassis. The at least one fastening element forms such a force introduction path if a relative spacing of the at least one component with respect to the chassis in the direction of straight-ahead travel at least reaches a predefined value.

In the context of the disclosure, a "drivetrain" is to be understood in particular to mean the combination of an internal combustion engine with a transmission unit.

The proposed fastening device may comprise a relatively simple construction and therefore may minimally increase manufacturing costs, if at all. In the case of a frontal contact event, in which the drivetrain accelerates counter to the direction of straight-ahead travel and is displaced at least as far as the predefined value of the relative spacing, the at least one fastening element is in a tensioned state and cannot form a force introduction path into the chassis of the motor vehicle. In this way, a movement of the at least one component for exhaust-gas aftertreatment counter to the direction of straight-ahead travel can be limited owing to the force introduction path formed by the at least one fastening element. In this way, contact between the component and a bulkhead of the engine system may be limited and/or blocked. As a result of the limitation of the movement of the at least one component for exhaust-gas aftertreatment in the case of a frontal contact event, it is possible in the engine compartment to use statically larger and thus more powerful other components, for example for exhaust-gas aftertreatment or for other purposes, because, owing to the dynamic compaction of the at least one component for exhaust-gas aftertreatment, less free deformation space is taken up.

The chassis of the motor vehicle may, at the location at which the at least one fastening element is fixedly attachable, be equipped with a subframe, the detachment of which from the remaining part of the chassis parallel to the direction of straight-ahead travel upon the onset of a frontal contact event is part of a vehicle platform deformation strategy, wherein energy is dissipated as a result of the detachment of the subframe. This may yield the additional advantage of the fastening device that a force transmitted from the at least one component for exhaust-gas aftertreatment via the force introduction path formed by the at least one fastening element promotes the detachment of the subframe from the remaining part of the chassis.

The fastening device according to the disclosure may be usable for a drivetrain which is arranged at least partially in an engine compartment in a vehicle front end of a motor vehicle. A "motor vehicle" is to be understood in the context of this disclosure to mean in particular a motor vehicle, a heavy goods vehicle, a tractor machine, or a motor bus.

The component for exhaust-gas aftertreatment may, without restriction to this, be in the form of an exhaust-gas catalytic converter, nitrogen oxide trap (Lean NOx Trap), diesel particle filter or gasoline particle filter, or urea injector.

The at least one fastening element may be fixedly attached to the at least one component for exhaust-gas aftertreatment in a lower region of said component in the installation state, which can result in expedient lever ratios for a limitation of the movement of the at least one component for exhaust-gas aftertreatment in the case of a frontal contact event.

In some embodiments of the fastening device, the at least one fastening element includes a flexible element with at least two end-side attachment elements. Here, at least in each case one of the attachment elements serves for fastening to the at least one component and for fastening to the chassis. In the context of the disclosure, a "flexible" material is to be understood in particular to mean a material which, when standing freely, can, in a direction transverse with respect to directions of its extent, only accommodate an externally acting force which amounts to only a small fraction, for example less than 1%, of a maximum externally acting force that the material can accommodate in the direction of its greatest extent.

In the normal installation state of the fastening device, the flexible element is not under tension and does not impede dynamic movements of the engine during the normal operation thereof. In a tensioned state during a frontal contact event, the flexible element can, in its extent direction between the attachment elements at one side, transmit an introduced force as a tensile stress to the chassis in an effective manner and limit a movement of the at least one component for exhaust-gas aftertreatment counter to the direction of straight-ahead travel.

The flexible element is preferably in the form of a metal mesh or in the form of a metal cable, whereby, in a suitable configuration, it is possible to provide an adequately high strength of the flexible element.

In preferred embodiments of the fastening device, the at least one fastening element has two mutually corresponding form-fit elements, of which one form-fit element is directly or indirectly connected fixedly to the at least one component for exhaust-gas aftertreatment and the corresponding form-fit element is directly or indirectly connected fixedly to the chassis. Here, the force introduction path parallel to the direction of straight-ahead travel between the at least one component and the chassis is formed by abutment of the corresponding form-fit elements against one another.

In the normal installation state of the fastening device, the two mutually corresponding form-fit elements are separated from one another and do not impede dynamic movements of the engine during the normal operation thereof. In a state during a frontal contact event, in which the relative spacing of the drivetrain with respect to the at least one component in the direction of straight-ahead travel at least reaches the predefined value, the two mutually corresponding form-fit elements abut against one another, such that an introduced force can be transmitted to the chassis in a desired manner. In this way, an impediment of the movement of the engine during normal operation can be blocked and, upon an onset of a frontal contact event, a movement of the at least one component for exhaust-gas aftertreatment counter to the direction of straight-ahead travel can be limited.

In one example, the corresponding form-fit elements are provided for forming a form-fit connection, which imparts a blocking action in two positions which are spaced apart from one another parallel to the direction of straight-ahead travel and in opposite directions. In the context of the disclosure, the expression "provided for" is to be understood to mean specifically configured or arranged for the stated purpose.

In this way, it can be ensured that the two mutually corresponding form-fit elements are not separated by the movement of the engine during normal operation such that the formation of the force introduction path parallel to the direction of straight-ahead travel is blocked by abutment of the corresponding form-fit elements against one another.

In one example, the corresponding form-fit elements are produced from sheet metal. As sheet metal, use may for example be made of sheet steel or high-grade sheet steel, because adequate tensile and flexural strength can be easily attained with these materials.

In some embodiments of the fastening device, in which the at least one fastening element has two mutually corresponding form-fit elements, the fixed attachment of one of the form-fit elements to the at least one component for exhaust-gas aftertreatment is produced via a cohesive connection. In this way, it is possible to attain an adequately strong attachment. For example, one of the form-fit elements may be welded to the at least one component, connected thereto by brazing, formed integrally thereon or connected thereto by adhesive bonding.

In one example, a maximum tensile load capacity of the at least one fastening element corresponds to at least 30 times the weight of the at least one component for exhaust-gas aftertreatment. In this way, a movement of the at least one component for exhaust-gas aftertreatment counter to the direction of straight-ahead travel can be limited even upon an onset of a frontal contact event at relatively high speeds and with associated relatively high forces.

In a further aspect of the disclosure, an exhaust-gas section of an internal combustion engine of a drivetrain of a motor vehicle, having at least one component for exhaust-gas aftertreatment, is provided. The exhaust-gas section has at least an embodiment of the proposed fastening device according to the disclosure. Here, the at least one fastening element is fixedly attached to the chassis of the motor vehicle. The advantages described in conjunction with the fastening device are transferable in full to the exhaust-gas section of the internal combustion engine.

The fixed attachment of the at least one fastening element to the chassis of the motor vehicle is produced via a cohesive connection. In this way, it is possible to attain an adequately strong attachment. For example, one of the form-fit elements may be welded to the at least one component, connected thereto by brazing, formed integrally thereon or connected thereto by adhesive bonding.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In the various figures, identical parts are always denoted by the same reference designations, for which reason said parts will generally also be described only once Turning now to FIG. 1, it shows a part of an exhaust-gas section 50 of an internal combustion engine and with a fastening device 10 according to the disclosure in an installation state in a schematic side view. The internal combustion engine is part of a drivetrain of a motor vehicle which comprises the internal combustion engine and a transmission, as illustrated in FIG. 9. The internal combustion engine is arranged in an engine compartment 64 of a vehicle front end of the motor vehicle.

The exhaust-gas section 50 may comprise a turbocharger 52 (FIG. 6) for attachment to a cylinder head of the internal combustion engine and may include a component 56 for exhaust-gas aftertreatment which may be attached to the turbocharger 52 via a flange connection 54. The component 56 for exhaust-gas aftertreatment may be formed by an exhaust-gas catalytic converter with a metallic housing 58, in which there may be arranged a lambda probe 60 as a sensor of a lambda control system for catalytic exhaust-gas purification. A compressor housing 62 may be flange-mounted on the outlet of the turbocharger 52. The exhaust-gas catalytic converter is arranged close to a bulkhead 68 (FIG. 1) which separates the engine compartment 64 from a compartment 66 of the motor vehicle.

Referring to FIG. 1, the exhaust-gas section 50 may include the fastening device 10 according to the disclosure, which serves for the fastening of the component 56 for exhaust-gas aftertreatment, specifically of the exhaust-gas catalytic converter, and which comprises a fastening element 12. The fastening element 12 may include a flexible element 14 with two end-side attachment elements 16, 18. The flexible element 14 may be in the form of a metal cable with twisted-together wires composed of steel. The end-side attachment elements 16, 18 are formed by cable eyes. One of the end-side attachment elements 16 (herein, a first extreme end 16) serves for fastening to the exhaust-gas catalytic converter and is fixedly attached to the metallic housing 58 of the exhaust-gas catalytic converter via a screw connection or other suitable connection (e.g., a weld, an adhesive, a fusion, etc.). The screw connection to the metallic housing 58 may be realized for example via a metallic connecting lug which is welded to the housing 58 of the exhaust-gas catalytic converter and which has a passage hole.

The other end-side attachment element 18 (herein, a second extreme end 18) may serve for the additional fastening of the fastening element 12 to a subframe 70, which is part of a chassis 72 of the motor vehicle. The fastening element 12 may be fixedly attached to the subframe 70 via a further screw connection. In the installation state illustrated in FIG. 1, the metal cable sags downward, parallel to the +Z-direction, which is normal to gravity 1, and thus does not form a force introduction path parallel to a direction of straight-ahead travel (−X direction) of the motor vehicle between the exhaust-gas catalytic converter and the chassis 72. In one example, gravity 1 is parallel to a Y-axis, which is normal to the XZ plane.

As illustrated, the first extreme end 16 is physically coupled to a portion of the component 56 distal to the flange 54. Additionally, the portion of the component 56 at which the first extreme end 16 is physically coupled may face a direction away from the bulkhead 68 and toward the subframe 70.

FIG. 2 shows the exhaust-gas section 50 as per FIG. 1 in the same view after the onset of a frontal contact event, in the case of which contact event the drivetrain together with the exhaust-gas section 50 accelerates counter to the direction of straight-ahead travel, that is to say in the +X direction, and is displaced relative to the chassis 72. In this way, a deformation of the front end of the vehicle may occur. If a relative spacing of the exhaust-gas catalytic converter with respect to the subframe 70 of the chassis 72 in the direction of straight-ahead travel at least reaches a predefined value, the metal cable of the fastening element 12 is placed under tension and forms a force introduction path 20 parallel to the direction of straight-ahead travel of the motor vehicle between the exhaust-gas catalytic converter and the chassis 72.

The fastening element 12 may comprise a maximum tensile load capacity which may correspond to more than 50 times the weight of the exhaust-gas catalytic converter. In the event of a further increase of the relative spacing between the exhaust-gas catalytic converter and the subframe 70 of the chassis 72, the increasing tensile force in the force introduction path 20 leads to a rotation 22 at least of the exhaust-gas catalytic converter about an axis (Y axis) which is arranged perpendicular to the XZ plane, whereby a movement of the exhaust-gas catalytic converter counter to the direction of straight-ahead travel can be limited.

In FIG. 2, dashed lines are used to show an expected movement of the exhaust-gas catalytic converter in the case of a frontal contact event without the fastening device 10 according to the disclosure. As illustrated, through the use of the fastening device 10 according to the disclosure, a movement of the exhaust-gas catalytic converter toward the bulkhead 68 and beyond to more rearward portions of the vehicle can be blocked via the fastening element 12.

FIGS. 3 to 8 show the exhaust-gas section 50 as per FIGS. 1 and 2 with alternative possible embodiments of the fastening element of the fastening device 10 according to the disclosure. To avoid repetitions, only differences in relation to the embodiment of the fastening element 12 as per FIGS. 1 and 2 will be described, below.

FIG. 3 shows the exhaust-gas section 50 as per FIG. 1 in the same view with an alternative embodiment 24 of the fastening element of the fastening device 10 according to the disclosure. The fastening element 24 has two mutually corresponding form-fit elements 26, 28 (herein, first form-fit element 26 and second form-fit element 28) which are produced from sheet metal, for example from sheet steel, as one example. However, it will be appreciated that the first and second form-fit elements 26, 28 may comprise other materials (e.g., aluminum). Each of the first and second form-fit elements 26, 28 may include a shape which may have been created for example by twofold bending of a rectangular metal sheet through 90° in the same direction and parallel to an edge line.

The first form-fit element 26 may be directly connected fixedly to the housing 58 of the exhaust-gas catalytic converter via a cohesive connection which may be produced via a welding process. The second form-fit element 28 may be connected fixedly to the chassis 72 of the motor vehicle indirectly via the subframe 70. The fixed attachment of the second form-fit element 28 to the subframe 70 may be formed by a cohesive connection, which may be produced via a welding process.

In alternative embodiments, the first and second form-fit elements 26, 28 may also be connected fixedly to the housing 58 of the exhaust-gas catalytic converter and to the subframe 70 of the chassis 72, respectively, via adhesively bonded connections, screw connections or rivet connections.

An orientation of the first and second form-fit elements 26, 28 may be selected such that the edges of the 90° bends are oriented parallel to the Y direction, that is to say perpendicular to the XZ plane.

In the installation state illustrated in FIG. 3, the first and second form-fit elements 26, 28 have been arranged so as to form a form-fit connection 30 which imparts a blocking action in two positions which are spaced apart from one another parallel to the direction of straight-ahead travel and in opposite directions, specifically in the +X direction and in the −X direction.

In the installation state (FIG. 3) without deformation to the vehicle front end, the two mutually corresponding form-fit elements 26, 28 are separated from one another and do not impede dynamic movements of the engine during the normal operation thereof. That is to say, the first and second form-fit elements 26, 28 may be spaced away from one another outside of a deformation to the vehicle front end.

FIG. 4 shows the exhaust-gas section 50 as per FIG. 3 in the same view after the onset of a frontal contact event, in which the drivetrain together with the exhaust-gas section 50 accelerates counter to the direction of straight-ahead travel and has been displaced relative to the chassis 72. If a relative spacing of the exhaust-gas catalytic converter with respect to the subframe 70 of the chassis 72 in the direction of straight-ahead travel at least reaches a predefined value, the first and second form-fit elements 26, 28 abut against one another, such that a force introduction path 20 parallel to the direction of straight-ahead travel between the exhaust-gas catalytic converter and the chassis 72 is formed, and an introduced force can be transmitted to the chassis 72 in an effective manner.

The fastening element 24 has a maximum tensile load capacity which corresponds to more than 50 times the weight of the exhaust-gas catalytic converter. In the event of a further increase of the relative spacing between the exhaust-gas catalytic converter and the subframe 70 of the chassis 72, the increasing tensile force in the force introduction path 20 leads to the rotation 22, already described above, at least of the exhaust-gas catalytic converter about an axis (Y axis) which is arranged perpendicular to the XZ plane, whereby a movement of the exhaust-gas catalytic converter counter to the direction of straight-ahead travel can be limited.

In FIG. 4, dashed lines are used to show an expected movement of the exhaust-gas catalytic converter in the case of a frontal contact event without the fastening device 10 according to the disclosure. As can be seen, through the use of the fastening device 10 according to the disclosure, it is possible in this case, too, for a movement of the exhaust-gas catalytic converter to the bulkhead 68 and a further rearward portion of the vehicle to be blocked.

FIG. 5 shows the exhaust-gas section 50 as per FIG. 1 in the same view with a further alternative embodiment 32 of the fastening element of the fastening device 10 according to the disclosure. The fastening element 32 of the fastening device 10 has two mutually corresponding form-fit elements 34, 36, (herein, a first form-fit element 34 and a second form-fit element 36) which have been produced from sheet metal, for example from sheet steel. However, other materials may be used if desired.

FIG. 6 shows the exhaust-gas section 50 as per FIG. 5 in a schematic front view. The first form-fit element 34 may be designed as a rectangular 90°-angled metal plate, one limb of which is fixedly connected to the subframe 70 of the chassis 72 and the other limb of which has a substantially rectangular aperture opening which lies in a plane perpendicular to the direction of straight-ahead travel (YZ plane) and is arranged above the subframe 70. The fixed connection to the subframe 70 of the chassis 72 may for example be formed in turn by a cohesive connection produced via a welding process or an adhesive bonding process.

The second form-fit element 36 may be designed as a substantially rectangular 90°-angled metal plate (FIG. 5), one limb of which may be fixedly connected at the end to the housing 58 of the catalytic converter, for example via a welded connection, and the other limb of which may be directed counter to the direction of straight-ahead travel, that is to say in the +X direction, and at the end has a width greater than a width of the rectangular aperture opening of the other form-fit element 34 (FIG. 6).

In the installation state (FIGS. 5 and 6), the limb of the first form-fit element 36 which has the increased width at the end extends through the rectangular aperture opening of the other form-fit element 34 in a direction from front to rear in relation to the direction of straight-ahead travel.

As in the embodiment of the fastening element 24 as per FIGS. 3 and 4, the first and second form-fit elements 34, 36 are thus arranged so as to form a form-fit connection 38 (FIG. 5) which imparts a blocking action in two positions which are spaced apart from one another parallel to the direction of straight-ahead travel (−X direction) and in opposite directions.

The first and second form-fit elements 34, 36 may be separated from one another and do not impede dynamic movements of the engine during the normal operation thereof.

After the onset of a frontal contact event, if a relative spacing of the exhaust-gas catalytic converter with respect to the subframe 70 of the chassis 72 in the direction of straight-ahead travel at least reaches a predefined value, the first and second form-fit elements 34, 36 abut against one another, such that a force introduction path parallel to the direction of straight-ahead travel between the exhaust-gas catalytic converter and the chassis 72 is formed, and an introduced force can, in the manner already described, be transmitted to the chassis 72 in an effective manner in order to limit the movement of the exhaust-gas catalytic converter.

FIG. 7 shows the exhaust-gas section 50 as per FIG. 1 in the same view with an alternative embodiment of the fastening element 40 of the fastening device 10 according to the disclosure. The fastening element 40 has two mutually corresponding form-fit elements 42, 44, (herein, first form-fit element 42 and second form-fit element 44) which have been produced from sheet metal, for example from sheet steel.

FIG. 8 shows the exhaust-gas section 50 as per FIG. 7 in a schematic front view. The first form-fit element 42 may be in the form of a circular ring which is oriented parallel to a plane (the YZ plane) perpendicular to the direction of straight-ahead travel of the motor vehicle and which is directly fixedly connected to the subframe 70 of the chassis 72 via a cohesive connection, which may be produced via a welding process or an adhesive bonding process.

The other corresponding form-fit element 44 may be designed as a 90°-angled metal plate (FIG. 7), one limb of which is fixedly connected at the end to the housing 58 of the catalytic converter, for example via a welded connection, and the other limb of which is directed counter (e.g., normal) to the direction of straight-ahead travel, that is to say in the +X direction, and at the end has a T-shaped widened portion, the width of which is greater than a diameter of the inner opening of the first form-fit element 42 in the form of a circular ring (FIG. 8).

In the installation state illustrated in FIGS. 7 and 8, the first and second form-fit elements 42, 44 are arranged so as to form a form-fit connection 46 which imparts a blocking action in two positions which are spaced apart parallel to the direction of straight-ahead travel and in opposite directions.

In the installation state where a frontal deformation has not occurred, the two mutually corresponding form-fit elements 42, 44 are separated from one another and do not impede dynamic movements of the engine during the normal operation thereof.

After the onset of a frontal contact event, if a relative spacing of the exhaust-gas catalytic converter with respect to the subframe 70 of the chassis 72 parallel to the direction of straight-ahead travel at least reaches a predefined value, the two mutually corresponding form-fit elements 42, 44 abut against one another, such that a force introduction path parallel to the direction of straight-ahead travel between the exhaust-gas catalytic converter and the chassis 72 is formed, and an introduced force can, in the manner already described, be transmitted to the chassis 72 in an effective manner in order to limit the movement of the exhaust-gas catalytic converter.

FIG. 9 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The emission control devices 170 may be substantially similar to the component 56 of FIG. 1. As such, the emission control devices 170 may comprise a fastener element configured to adjust a direction of travel of one or more aftertreatment devices in response to a vehicle deformation. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger.

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159.

Electric machine 151 may also be operated as a generator to provide electrical power to charge battery 161, for example during a braking operation.

In this way, an aftertreatment device may be urged in a direction away from a remainder of a vehicle in response to a front vehicle deformation. A coupling element, which may be loose or not engaged during non-deformation conditions may become engaged or tightened during a deformation condition, which may adjust a travel path of the aftertreatment device in response to the deformation. In one example, the coupling element provides a rotational force relative to a directional force of the deformation which adjusts a travel path of the aftertreatment device. The technical effect of the coupling element is to decrease an amount of space needed between the aftertreatment device and the bulkhead, which may provide a greater amount of packaging space for other engine components.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a fastening system comprising a tether physically coupled to each of an aftertreatment device of an exhaust aftertreatment system at a first extreme end and a vehicle subframe at a second extreme end, wherein the aftertreatment device is coupled to a turbocharger via a flange, wherein the aftertreatment device is arranged proximally to a bulkhead that separates an engine compartment from a compartment of a motor vehicle, and wherein the fastening system and the aftertreatment device are arranged in the engine compartment.

2. The system of claim 1, wherein the tether is loose during conditions where a deformation to the vehicle subframe is not occurring.

3. The system of claim 2, wherein the tether is taut during conditions where the deformation to the vehicle subframe is occurring.

4. The system of claim 1, wherein the tether is a metal cable.

5. The system of claim 1, wherein the tether is flexible.

6. The system of claim 1, wherein the tether is configured to extend and adjust a direction of travel of the aftertreatment device in response to a deformation of the vehicle subframe, and wherein the direction of travel of the aftertreatment device is opposite to a direction in which the motor vehicle is propelled while in a drive gear.

7. The system of claim 6, wherein the aftertreatment device is arranged in a front end of the motor vehicle, and wherein the turbocharger is arranged in an engine compartment and coupled to a cylinder head of the engine.

8. A system, comprising:
a fastening system comprising a tether physically coupled to each of an aftertreatment device of an exhaust aftertreatment system at a first extreme end and a vehicle subframe at a second extreme end, wherein the tether is loose when the vehicle subframe is not deformed and tightens as the vehicle subframe deforms, wherein a flange physically couples the aftertreatment device to a turbocharger, wherein the aftertreatment device is arranged proximally to a bulkhead that separates an engine compartment from a compartment of a motor vehicle, and wherein the fastening system and the aftertreatment device are arranged in the engine compartment.

9. The system of claim 8, wherein the tether is flexible and comprises a metal cable.

10. The system of claim 8, wherein the first extreme end of the tether is physically coupled to a portion of the aftertreatment device opposite the flange.

11. The system of claim 8, wherein the tether is configured to apply a rotational force to the aftertreatment device in response to the tether being elongated beyond a threshold.

12. The system of claim 8, wherein the aftertreatment device and the tether are arranged at a front end of a vehicle.

* * * * *